United States Patent [19]
Grimes

[11] Patent Number: 5,853,021
[45] Date of Patent: Dec. 29, 1998

[54] PRESSURE LIMITING TIRE DEFLATOR SYSTEM

[76] Inventor: Bill Grimes, 32 River Rd., Chesapeake City, Md. 21915

[21] Appl. No.: 853,365

[22] Filed: May 8, 1997

[51] Int. Cl.⁶ .................................................. F16K 15/20
[52] U.S. Cl. .......................... 137/230; 137/231; 137/524; 137/539
[58] Field of Search ..................... 137/228, 230, 137/231, 224, 226, 516.11, 539, 524

[56] References Cited

U.S. PATENT DOCUMENTS

| | | | |
|---|---|---|---|
| 1,104,902 | 7/1914 | Javris | 137/230 |
| 1,769,240 | 7/1930 | Smith | 137/226 |
| 1,815,533 | 7/1931 | Vincent | 137/224 |
| 2,505,949 | 5/1950 | Vilbiss | 137/230 |
| 3,148,707 | 9/1964 | Smyklo | 137/539 X |
| 5,035,261 | 7/1991 | Koiwa | 137/516.11 |

FOREIGN PATENT DOCUMENTS

| | | | |
|---|---|---|---|
| 562080 | 8/1923 | France | 137/230 |
| 445358 | 11/1946 | Italy | 137/224 |
| 87042 | 1/1956 | Norway | 137/539 |
| 369069 | 3/1932 | United Kingdom | 137/228 |
| 692949 | 6/1953 | United Kingdom | 137/539 |

*Primary Examiner*—John Rivell
*Assistant Examiner*—Meredith H. Schoenfeld

[57] ABSTRACT

A new Pressure Limiting Tire Deflator System for deflating a tire to a pre-selected pressure for increasing traction during travel within loose dirt or sand. The inventive device includes a spherical head formed for engaging a valve stem, an elongated neck, an air passage projecting through the spherical head and through the elongated neck, a plurality of air release passages, and a pressure limiter within the air passage. The pressure limiter is adjustable for preventing air pressure within the tire from falling below the pre-selected pressure.

6 Claims, 3 Drawing Sheets

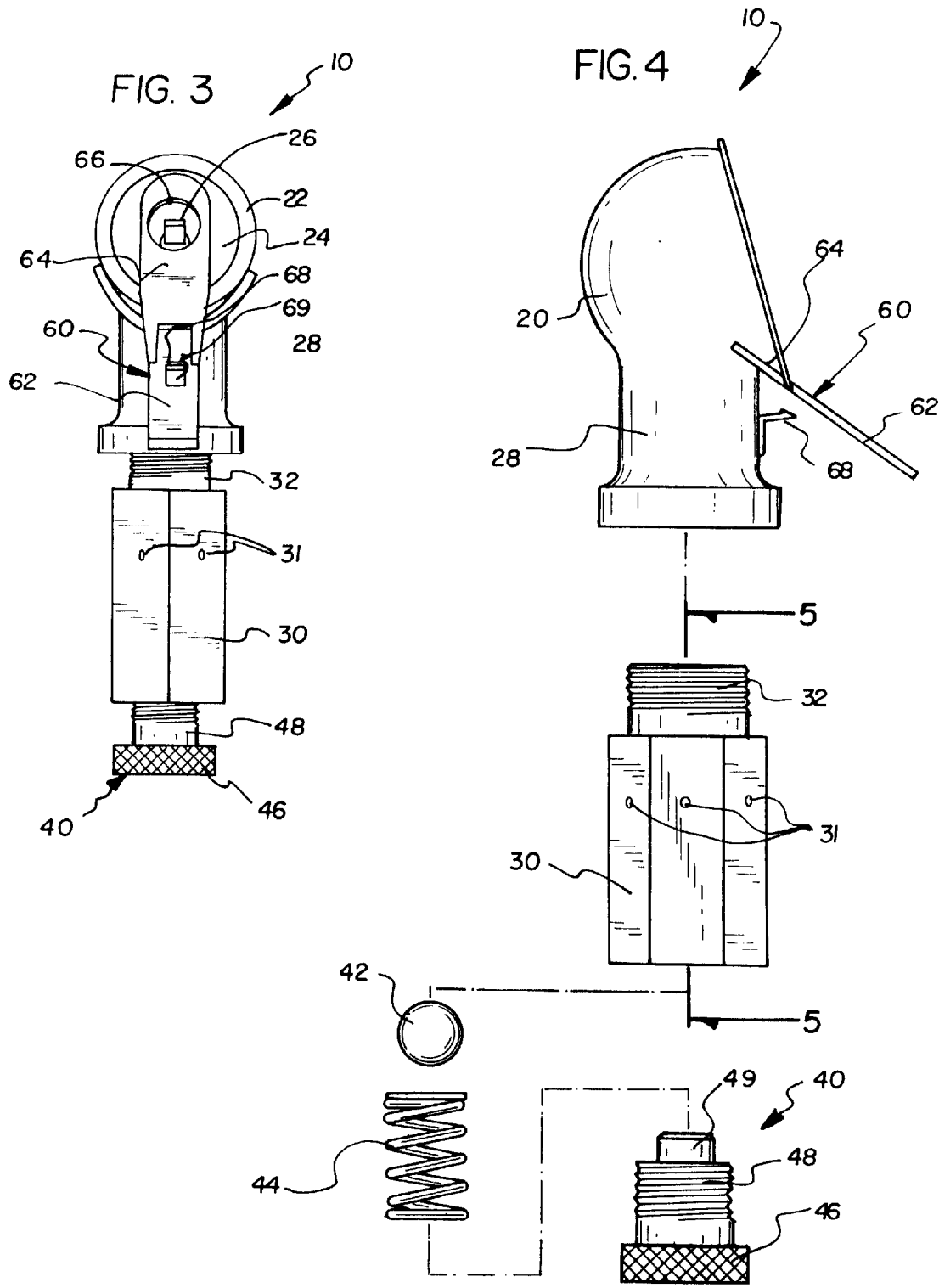

PRESSURE LIMITING TIRE DEFLATOR SYSTEM

BACKGROUND OF THE INVENTION

1. Field of the Invention

The present invention relates to Tire Deflation Devices and more particularly pertains to a new Pressure Limiting Tire Deflator System for deflating a tire to a pre-selected pressure for increasing traction during travel within loose dirt or sand.

2. Description of the Prior Art

The use of Tire Deflation Devices is known in the prior art. More specifically, Tire Deflation Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Tire Deflation Devices include U.S. Pat. No. 4,729,337; U.S. Pat. No. 4,681,148; U.S. Pat. 4,569,363; U.S. Design Patent 338,839; U.S. Pat. No. 5,007,449 and U.S. Pat. No. 4,658,869.

While these devices fulfill their respective, particular objectives and requirements, the aforementioned patents do not disclose a new Pressure Limiting Tire Deflator System. The inventive device includes a spherical head formed for engaging a valve stem, an elongated neck, an air passage projecting through the spherical head and through the elongated neck, a plurality of air release passages, and a pressure limiter within the air passage.

In these respects, the Pressure Limiting Tire Deflator System according to the present invention substantially departs from the conventional concepts and designs of the prior art, and in so doing provides an apparatus primarily developed for the purpose of deflating a tire to a preselected pressure for increasing traction during travel within loose dirt or sand.

SUMMARY OF THE INVENTION

In view of the foregoing disadvantages inherent in the known types of Tire Deflation Devices now present in the prior art, the present invention provides a new Pressure Limiting Tire Deflator System construction wherein the same can be utilized for deflating a tire to a pre-selected pressure for increasing traction during travel within loose dirt or sand.

The general purpose of the present invention, which will be described subsequently in greater detail, is to provide a new Pressure Limiting Tire Deflator System apparatus and method which has many of the advantages of the Tire Deflation Devices mentioned heretofore and many novel features that result in a new Pressure limiting Tire Deflator System which is not anticipated, rendered obvious, suggested, or even implied by any of the prior art Tire Deflation Devices, either alone or in any combination thereof To attain this, the present invention generally comprises a spherical head formed for engaging a valve stem, an elongated neck, an air passage projecting through the spherical head and through the elongated neck, a plurality of air release passages, and a pressure limiter within the air passage.

There has thus been outlined, rather broadly, the more important features of the invention in order that the detailed description thereof that follows may be better understood, and in order that the present contribution to the art may be better appreciated. There are additional features of the invention that will be described hereinafier and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Pressure Limiting Tire Deflator System apparatus and method which has many of the advantages of the Tire Deflation Devices mentioned heretofore and many novel features that result in a new Pressure Limiting Tire Deflator System which is not anticipated, rendered obvious, suggested, or even implied by any of the prior art Tire Deflation Devices, either alone or in any combination thereof It is another object of the present invention to provide a new Pressure Limiting Tire Deflator System which may be easily and efficiently manufactured and marketed.

It is a further object of the present invention to provide a new Pressure Limiting Tire Deflator System which is of a durable and reliable construction.

An even further object of the present invention is to provide a new Pressure Limiting Tire Deflator System which is susceptible of a low cost of manufacture with regard to both materials and labor, and which accordingly is then susceptible of low prices of sale to the consuming public, thereby making such Pressure limiting Tire Deflator System economically available to the buying public.

Still yet another object of the present invention is to provide a new Pressure Limiting Tire Deflator System which provides in the apparatuses and methods of the prior art some of the advantages thereof while simultaneously overcoming some of the disadvantages normally associated therewith.

Still another object of the present invention is to provide a new Pressure Limiting Tire Deflator System for deflating a tire to a pre-selected pressure for increasing traction during travel within loose dirt or sand.

Yet another object of the present invention is to provide a new Pressure limiting Tire Deflator System which includes a spherical head formed for engaging a valve stem, an elongated neck, an air passage projecting through the spherical head and through the elongated neck, a plurality of air release passages, and a pressure limiter within the air passage.

Still yet another object of the present invention is to provide a new Pressure Limiting Tire Deflator System that is compact enough to be stored within most areas upon a vehicle.

Even still another object of the present invention is to provide a new Pressure limiting Tire Deflator System that provides a uniform tire pressure within all tires upon the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein:

FIG. 3 is a front view of the present invention.

FIG. 4 is an exploded side view of the present invention.

DESCRIPTION OF THE PREFERRED EMBODIMENT

Figure 1:
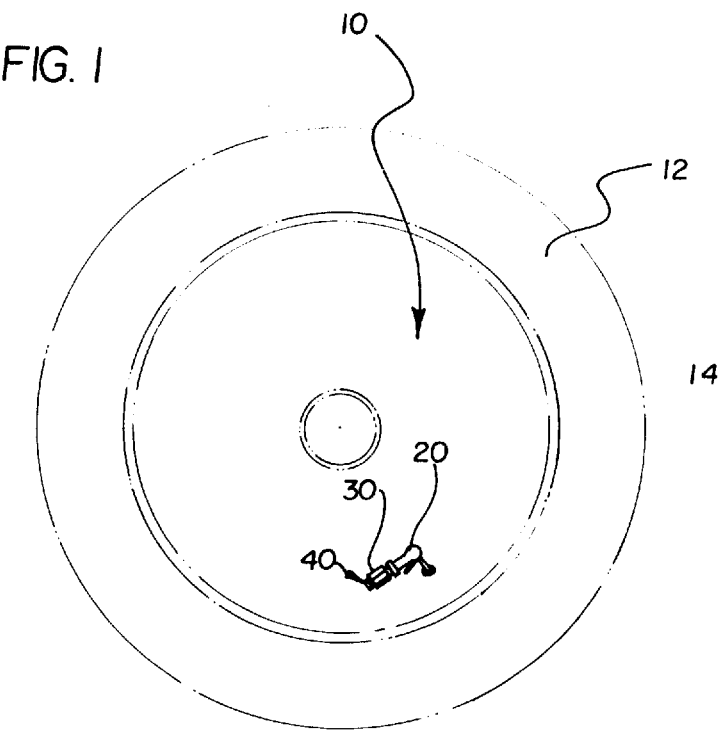
FIG. 1 is an upper perspective view of a new Pressure Limiting Tire Deflator System according to the present invention.

With reference now to the drawings, and in particular to FIGS. 1 through 6 thereof, a new Pressure Limiting Tire Deflator System embodying the principles and concepts of the present invention and generally designated by the reference numeral 10 will be described.

More specifically, it will be noted that the Pressure Limiting Tire Deflator System 10 comprises a spherical head 20 formed for engaging a valve stein 14, an elongated neck 30, an unnumbered air passage projecting through the spherical head 20 and through the elongated neck 30, a plurality of air release passages 31, and a pressure limiting means 40 within the unnumbered air passage.

Figure 2:
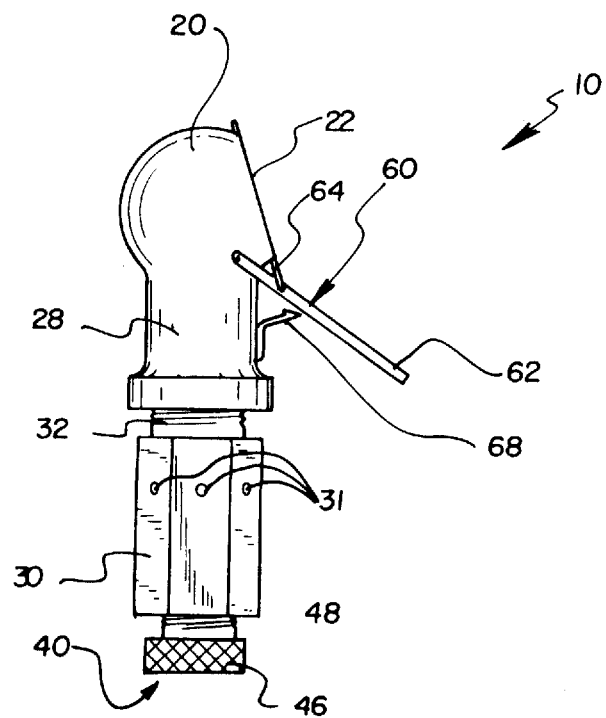
FIG. 2 is a side view of the present invention.
Figure 5:
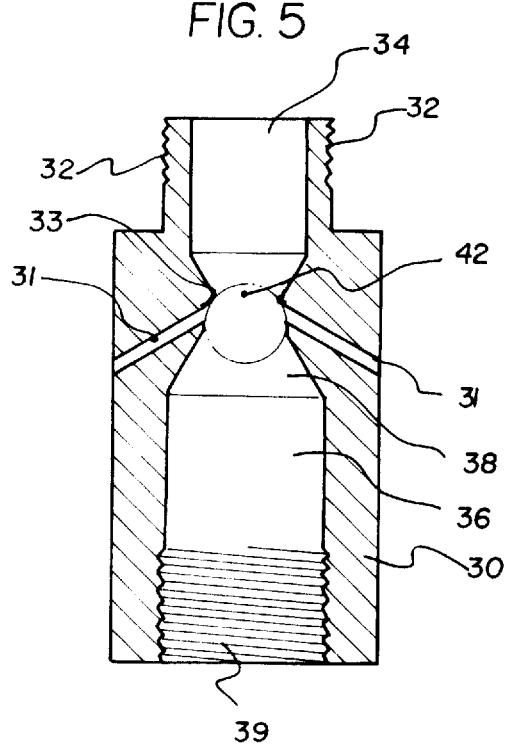
FIG. 5 is a cross sectional view taken along line 5—5 of FIG. 4.

As shown in FIGS. 2 through 4, the spherical head 20 has a swaged face 22. The swaged face 22 includes a cavity 24 having a swaged bottom surface for receiving and sealing with an end of a valve stem 14 within a tire 12 as shown in FIG. 3 of the drawings. A plunger 26 is attached concentrically and orthogonally to the swaged bottom surface of the cavity 24 for engaging an unnumbered filler valve within the valve stem 14 for allowing deflation of the tire 12. The extended portion 28 is attached to the spherical head 20 projecting substantially parallel to a plane of the swaged face 22 as shown in FIGS. 2 through 4 of the drawings. The unnumbered air passage projects through the swaged bottom surface of the cavity 24 coaxially with the plunger 26. The unnumbered air passage thereafter projects through the spherical head 20 and thereafter the unnumbered air passage projecting through the extended portion 28 opposite of the spherical head 20. As shown in FIGS. 2 through 4, the elongated neck 30 has a first end and a second end. As best shown in FIGS. 2 and 4, the first end is removably attached to the extended portion 28 opposite of the spherical head 20. An upper passage 34 projects into the first end a finite distance coaxially with the elongated neck 30 and connecting to the unnumbered air passage as shown in FIG. 5 of the drawings. As shown in FIG. 5 of the drawings, a lower passage 36 projects into the second end a finite distance coaxially with the elongated neck 30. The lower passage 36 preferably has a larger diameter than the upper passage 34. As shown in FIG. 5 of the drawings, a conical tapering neck 38 has a large end and a small end. The conical tapering neck 38 is positioned within the elongated neck 30 with the large end connected coaxially with the lower passage 36 opposite of the second end. A spherical seat 33 is positioned within the elongated neck 30 connected to the small end of the conical tapering neck 38. The spherical seat 33 is connected to the upper passage 34 opposite of the first end thereby connecting the upper passage 34 with the lower passage 36. This allows air to flow through the unnumbered air passage through the upper passage 34 and then through the lower passage 36 from within the tire 12. As shown in FIGS. 2 through 5, the elongated neck 30 includes a first threaded male end 32 secured to the first end of the elongated neck 30 for threadably engaging the extended portion 28 opposite of the spherical head 20.

Figure 6:
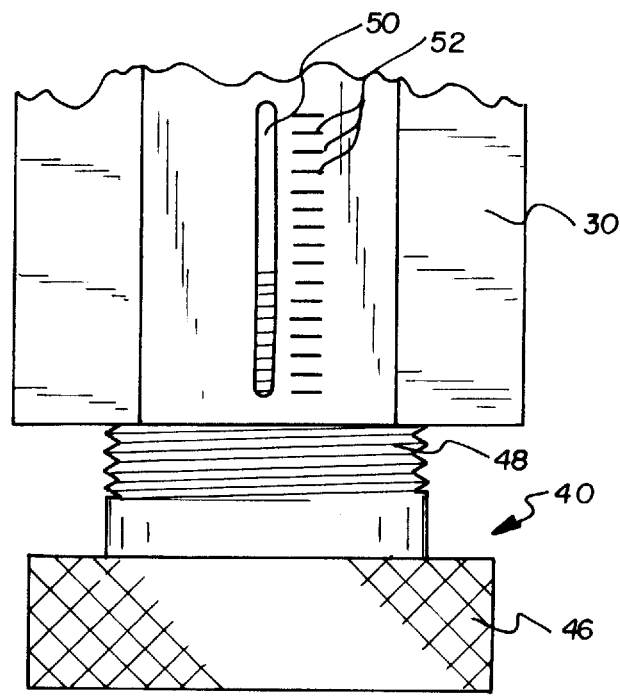
FIG. 6 is a magnified side view of the pressure limiting means.

As shown in FIGS. 1 through 6 of the drawings, the pressure limiting means 40 is positioned within the lower passage 36 and the conical tapering neck 38 for allow the release of the air when an interior pressure of the air within the tire 12 is above a pre-selected pressure by the user. The pressure limiting means 40 comprises a spherical seal 42 movably positioned within the conical tapering neck 38 for engaging and sealing the spherical seat 33. A compression spring 44 is coaxial with the elongated neck 30 and engages the spherical seal 42 as best shown in FIG. 4 of the drawings. As shown in FIGS. 1 through 6 of the drawings, a cylindrical knob 46 for grasping and rotating by a user secures a second threaded male end 48. The second threaded male end 48 is juxtaposed to the compression spring 44 opposite of the spherical seal 42. The elongated neck 30 includes an interiorly threaded end 39 within the lower passage 36 adjacent the second end for receiving the second threaded male end 48 as shown in FIG. 5 of the drawings. The user manually adjusts the compression of the compression spring 44 by rotating the cylindrical knob 46 thereby forcing the spherical seal 42 against the spherical seat 33. The forcing of the spherical seal 42 against the spherical seat 33 stops the air from flowing out from within the tire 12 if the interior pressure of the air is below the pre-selected pressure controlled by rotating the cylindrical knob 46. A plurality of air release passages 31 project substantially radially from within the spherical seat 33 to an exterior surface of the elongated neck 30 thereby allowing the air to flow out from within the tire 12 when the interior pressure is greater than the pre-selected pressure. A cylindrical nub 49 is attached to the second threaded male end 48. The cylindrical nub 49 projects within the compression spring 44 coaxially for preventing non-longitudinal movement of the compression spring 44. As shown in FIG. 6 of the drawings, a slot 50 projects into the elongated neck 30 parallel to a longitudinal axis of the elongated neck 30 near the second end for allowing viewing of the position of the second threaded male end. A plurality of indicia 52 are secured adjacent the slot 50 for indicating the pre-selected pressure by the user.

As shown in FIGS. 1 through 4 of the drawings, a conventional stem attaching device 60 is secured to the spherical head 20 for allowing quick-coupling and retention of the spherical head 20 to the valve stem 14 during deflation of the tire 12. The conventional stem attaching device 60 comprises a locking lever 62 pivotally attached to the spherical head 20. As shown in FIG. 3 of the drawings, a tongue member 64 has a stem aperture 66 for receiving the valve stem 14. The tongue member 64 is pivotally attached to the locking lever 62. A locking aperture 69 projects through the locking lever 62, and a locking pin 68 is secured to the extended portion 28 for catchably retaining the locking lever 62 adjacent the extended portion 28 by projecting through the locking aperture 69.

In use, the user manually rotates the cylindrical knob 46 until an upper edge of the second threaded male end 48 is aligned with the desired indicia 52 representing the desired preselected pressure. Thereafter, the swaged bottom surface of the cavity 24 is positioned juxtaposed to the end of the valve stem 14 whereby the plunger 26 engages the filler valve thereby allowing the release of air from within the tire 12. The conventional stem attaching device 60 is locked into position thereby engaging the valve stem 14 to prevent removal of the valve stein 14 from the present invention and eliminating the need for the user to manually retain the present invention upon the valve stein 14. The air projects through the unnumbered air passage through the spherical head 20 then through the extended portion 28. The pressure of the air forces the spherical seal 42 to disengage from the spherical seat thereby compressing the compression spring 44. The air thereafter escapes through the plurality of air release passages 31 emitting a whistle sound until the air pressure within the tire 12 drops to the pre-selected pressure by the user by manipulating the cylindrical knob 46. The spherical seal 42 engages the spherical seat 33 thereby closing the plurality of air release passages 31, thereby terminating the whistle sound to inform the user that the deflation process has been completed. The user then repeats the above stated process for the remaining tires 12 upon the vehicle, thereby providing a uniform tire pressure within each tire 12 for providing increased traction while traveling within loose dirt or sand.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and chances will readily occur to those skilled in the art, it is not desired to limit the invention to the exact construction and operation shown and described, and accordingly, all suitable modifications and equivalents may be resorted to, falling within the scope of the invention.

I claim:

1. A pressure limiting tire deflator system comprising:

a spherical head having a substantially planar face;

said face including a cavity having a bottom surface for receiving and sealing with an end of a valve stem of a tire;

a plunger attached concentrically and orthogonally to said bottom surface for engaging a filler valve within said valve stem for allowing deflation of said tire;

an extended portion attached to said spherical head projecting substantially parallel to said planar face;

an air passage projecting through said bottom surface coaxially with said plunger and projecting through said spherical head and thereafter said air passage projecting through said extended portion opposite of said spherical head;

an elongated neck having a first end and a second end, wherein said first end is removably attached to said extended portion opposite of said spherical head;

an upper passage projecting into said first end a finite distance coaxially with said elongated neck;

a lower passage projecting into said second end a finite distance coaxially with said elongated neck, wherein said lower passage has a larger diameter than said upper passage;

a conical tapering neck having a large end and a small end, wherein said conical tapering neck is positioned within said elongated neck with said large end connected coaxially with said lower passage opposite of said second end;

a spherical seat positioned within said elongated neck connected to said small end of said conical tapering neck and connected to said upper passage opposite of said first end thereby connecting said upper passage with said lower passage thereby allowing air to flow from within said tire into said air passage through said upper passage and through said lower passage; and a pressure limiting means positioned within said lower passage and said conical tapering neck for allow the release of said air when an interior pressure of said air within said tire is above a pre-selected pressure;

wherein said pressure limiting means comprises:

a spherical seal movably positioned within said conical tapering neck for engaging and sealing said spherical seat;

a compression spring engaging said spherical seal;

a hand operable spring adjustment means for compressing said spring to adjust the pressure of said seal against said seat whereby said pre-selected pressure is adjustable;

a plurality of air release passages projecting substantially radially from within said spherical seat to an exterior surface of said elongated neck to allow said air to flow out from said tire when said interior pressure is greater than said pre-selected pressure.

2. A pressure limiting tire deflator system comprising:

a spherical head having a swaged face;

said swaged face includes a cavity having a swaged bottom surface for receiving and scaling with an end of a valve stem within a tire;

a plunger attached concentrically and orthogonally to said swaged bottom surface for engaging a filler valve within said valve stem for allowing deflation of said tire;

an extended portion attached to said spherical head projecting substantially parallel to a plane of said swaged face;

an air passage projecting through said swaged bottom surface coaxially with said plunger and projecting through said spherical head and thereafter said air passage projecting through said extended portion opposite of said spherical head;

an elongated neck having a first end and a second end, wherein said first end is removably attached to said extended portion opposite of said spherical head;

an upper passage projects into said first end a finite distance coaxially with said elongated neck;

a lower passage projects into said second end a finite distance coaxially with said elongated neck, wherein said lower passage has a larger diameter than said upper passage;

a conical tapering neck having a large end and a small end, wherein said conical tapering neck is positioned within said elongated neck with said large end connected coaxially with said lower passage opposite of said second end;

a spherical seat positioned within said elongated neck connected to said small end of said conical tapering neck and connected to said upper passage opposite of said first end thereby connecting said upper passage with said lower passage thereby allowing air to flow through said air passage through said upper passage and then through said lower passage from within said tire;

a pressure limiting means positioned within said lower passage and said conical tapering neck for allow the release of said air when an interior pressure of said air within said tire is above a pre-selected pressure; and wherein said pressure limiting means comprises:

a spherical seal movably positioned within said conical tapering neck for engaging and sealing said spherical seat;

a compression spring coaxial with said elongated neck engages said spherical seal;

a cylindrical knob for grasping and rotating by a user;

a second threaded male end attached to said cylindrical knob, wherein said second threaded male end is juxtaposed to said compression spring opposite of said spherical seal;

said elongated neck includes an interiorly threaded end within said lower passage adjacent said second end for receiving said second threaded male end, whereby said user manually adjusts the compression of said compression spring by rotating said cylindrical knob thereby forcing said spherical seal against said spherical seat thereby stopping said air from flowing from within said tire if said interior pressure of said air is below said preselected pressure controlled by rotating said cylindrical knob;

a plurality of air release passages project substantially radially from within said spherical seat to an exterior surface of said elongated neck thereby allowing said air to flow out from within said tire when said interior pressure is greater than said pre-selected pressure; and a cylindrical nub attached to said second threaded male end and projecting within said compression spring coaxially for preventing non-longitudinal movement of said compression spring.

3. The pressure limiting tire deflator system of claim 2, including a slot projecting into said elongated neck parallel to a longitudinal axis of said elongated neck near said second end, and a plurality of indicia adjacent said slot for indicating said pre-selected pressure.

4. The pressure limiting tire deflator system of claim 3, including a conventional stem attaching device secured to said spherical head for allowing quick-coupling and retention of said spherical head to said valve stem during deflation of said tire, wherein said conventional stem attaching device comprises a locking lever pivotally attached to said spherical head, a tongue member having a stem aperture for receiving said valve stem and pivotally attached to said locking lever, a locking aperture projects through said locking lever, and a locking pin secured to said extended portion for catchably retaining said locking lever adjacent said extended portion by projecting through said locking aperture within said locking lever.

5. The pressure limiting tire deflator system of claim 4, wherein said elongated neck includes a first threaded male end secured to said first end for threadably engaging said extended portion opposite of said spherical head.

6. A pressure limiting tire deflator system comprising:

a head having a face;

said face includes a cavity having a bottom surface for receiving and sealing with an end of a valve stem within a tire;

a plunger attached concentrically and orthogonally to said bottom surface for engaging a filler valve within said valve stem for allowing deflation of said tire;

an extended portion attached to said head projecting substantially parallel to a plane of said face;

an air passage projecting through said bottom surface coaxially with said plunger and projecting through said head and thereafter said air passage projecting through said extended portion opposite of said head;

an elongated neck having a first end and a second end, wherein said first end is removably attached to said extended portion opposite of said head;

an upper passage projects into said first end a finite distance coaxially with said elongated neck;

a lower passage projects into said second end a finite distance coaxially with said elongated neck, wherein said lower passage has a larger diameter than said upper passage;

a substantially conical tapering neck having a large end and a small end, wherein said conical tapering neck is positioned within said elongated neck with said large end connected coaxially with said lower passage opposite of said second end;

a substantially spherical seat positioned within said elongated neck connected to said small end of said tapering neck and connected to said upper passage opposite of said first end, said seat connecting said upper passage with said lower passage for allowing air to flow through said air passage, said upper passage and said lower passage from in said tire;

a pressure limiting means positioned in said lower passage and said tapering neck for allow the release of said air when an interior pressure of said air in said tire is above a pre-selected pressure; and wherein said pressure limiting means comprises:

a substantially spherical seal movably positioned within said conical tapering neck for engaging and sealing said seat;

a compression spring positioned coaxial with said elongated neck and engaging said seal;

a cylindrical knob for grasping and rotating by a user;

a second threaded male end attached to said cylindrical knob, wherein said second threaded male end is positioned adjacent to said compression spring opposite of said seal;

said elongated neck includes an interiorly threaded end within said lower passage adjacent said second end for receiving said second threaded male end, whereby said user manually adjusts the compression of said compression spring by rotating said cylindrical knob to force said seal against said seat to thereby stop said air from flowing out of said tire if said interior pressure of said air is below said pre-selected pressure controlled by rotating said cylindrical knob;

a plurality of air release passages project substantially radially from within said seat to an exterior surface of said elongated neck thereby allowing said air to flow out from within said tire when said interior pressure is greater than said pre-selected pressure; and a cylindrical nub attached to said second threaded male end and projecting into said compression spring coaxially for preventing non-longitudinal movement of said compression spring.

\* \* \* \* \*